US012547216B2

(12) United States Patent
Chen et al.

(10) Patent No.: US 12,547,216 B2
(45) Date of Patent: Feb. 10, 2026

(54) LAPTOP COMPUTER

(71) Applicant: Acer Incorporated, New Taipei (TW)

(72) Inventors: Hung-Chi Chen, New Taipei (TW);
Cheng-Han Lin, New Taipei (TW);
Huei-Ting Chuang, New Taipei (TW);
Po-Yi Lee, New Taipei (TW);
Yen-Chieh Chiu, New Taipei (TW);
Chao-Di Shen, New Taipei (TW)

(73) Assignee: Acer Incorporated, New Taipei (TW)

( * ) Notice: Subject to any disclaimer, the term of this patent is extended or adjusted under 35 U.S.C. 154(b) by 142 days.

(21) Appl. No.: 18/427,837

(22) Filed: Jan. 31, 2024

(65) Prior Publication Data

US 2025/0076934 A1 Mar. 6, 2025

(30) Foreign Application Priority Data

Aug. 29, 2023 (TW) ................................ 112132625

(51) Int. Cl.
G06F 1/16 (2006.01)

(52) U.S. Cl.
CPC .......... *G06F 1/1656* (2013.01); *G06F 1/1679* (2013.01)

(58) Field of Classification Search
CPC .... G06F 1/1601; G06F 1/1613; G06F 1/1633; G06F 1/1656; G06F 1/1669; G06F 1/1679
See application file for complete search history.

(56) References Cited

U.S. PATENT DOCUMENTS

| | | | | |
|---|---|---|---|---|
| 6,480,373 | B1 * | 11/2002 | Landry | G06F 1/1616 |
| | | | | 708/142 |
| 6,510,048 | B2 * | 1/2003 | Rubenson | G06F 1/1679 |
| | | | | 361/679.17 |
| 10,656,673 | B1 * | 5/2020 | Su | G06F 1/1662 |
| 2010/0277858 | A1 * | 11/2010 | Zhou | G06F 1/1669 |
| | | | | 361/679.17 |
| 2011/0304565 | A1 * | 12/2011 | Liu | G06F 1/1656 |
| | | | | 361/728 |
| 2022/0147111 | A1 * | 5/2022 | Zou | G06F 1/3215 |
| 2024/0201749 | A1 * | 6/2024 | Tsen | G06F 1/1662 |
| 2025/0208663 | A1 * | 6/2025 | Akin-Sodipo | H04M 1/0216 |

* cited by examiner

*Primary Examiner* — Anthony Q Edwards
(74) *Attorney, Agent, or Firm* — JCIPRNET

(57) ABSTRACT

A laptop computer including a system host, a modular platform, a rail structure, and at least one tool is provided. The rail structure is disposed at the system host and the modular platform, and the modular platform slides relative to the system host via the rail structure to be assembled to or detached from the system host. The tool is plugged into or out of the system host, and the tool is located on a sliding path of the modular platform when the tool is assembled to the system host.

9 Claims, 9 Drawing Sheets

LAPTOP COMPUTER

CROSS-REFERENCE TO RELATED APPLICATION

This application claims the priority benefit of Taiwan application serial no. 112132625, filed on Aug. 29, 2023. The entirety of the above-mentioned patent application is hereby incorporated by reference herein and made a part of this specification.

BACKGROUND

Technical Field

The invention relates to a laptop computer.

Description of Related Art

When the existing laptop computer is being repaired or upgraded, it is necessary to first disassemble the casing from the bottom of the laptop computer, and then disassemble the hardware to be replaced, so the number of screws to be removed with a screwdriver is quite large. Since the screws tend to roll on a flat surface and fall off, repairman usually collects all the screws and place them into a storage box. Therefore, the screws of different specifications are often mixed together. After the repair is completed, the user must find the screws of corresponding specifications from the storage box, which will increase the assembly time required for restoration.

Furthermore, with the rise of environmental awareness, especially under the framework of environmental, social, and corporate governance (ESG), existing consumer electronic products need to extend their service life, which has become one of the evaluation criteria for corporate sustainable operations. Therefore, for the portable electronic devices, how to make them have better replaceability or repairability has become a topic that needs to be considered during product design.

SUMMARY

The present invention provides a laptop computer with a modular platform to provide users with a simple disassembly and assembly mechanism.

The laptop computer of the present invention includes a system host, a modular platform, a rail structure, and at least one tool is provided. The rail structure is disposed at the system host and the modular platform, and the modular platform slides relative to the system host via the rail structure to be assembled to or detached from the system host. The tool is plugged into or out of the system host, and the tool is located on a sliding path of the modular platform when the tool is assembled to the system host.

Based on above, the laptop computer provides the modular platform for the convenience of disassembly and assembly by users, so that the modular platform can be slidably assembled on the system host through the rail structure. Furthermore, for the aforementioned convenience of disassembly and assembly, the laptop computer also provides the tool, and the tool is pluggably assembled in the system host, so that the tool can be used directly during disassembly and assembly without the need for additional preparation. More importantly, when the laptop computer assembles the tool into the system host, it is located on the sliding path of the modular platform. In this way, the tool inserted into the system host can become a latch structure that controls whether the modular platform can be removed from the system host, and further endows the tool with an additional latch function.

DESCRIPTION OF THE EMBODIMENTS

Figure 1A:
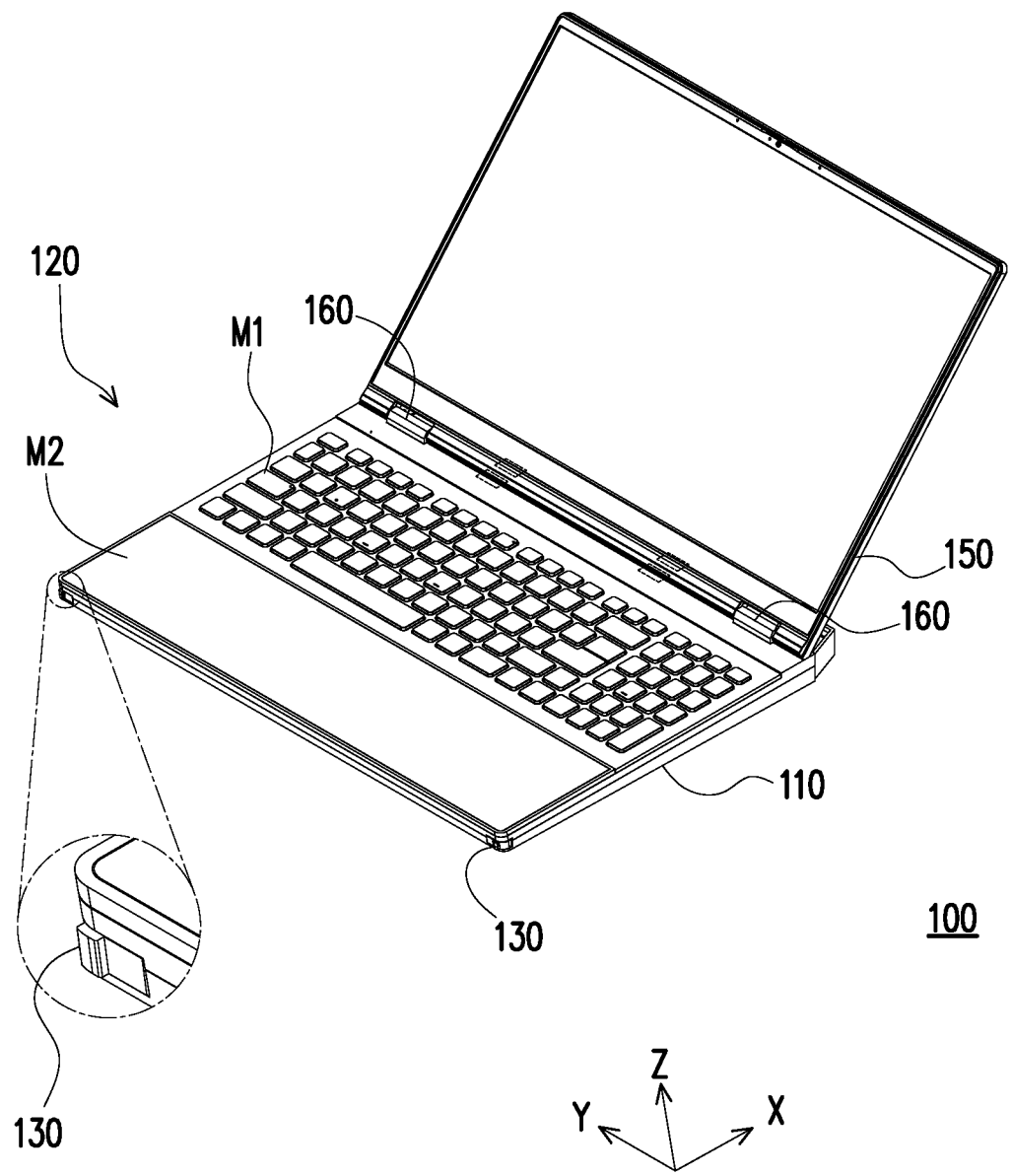
FIG. 1A is a schematic diagram of the laptop computer according to an embodiment of the present invention.
Figure 1B:
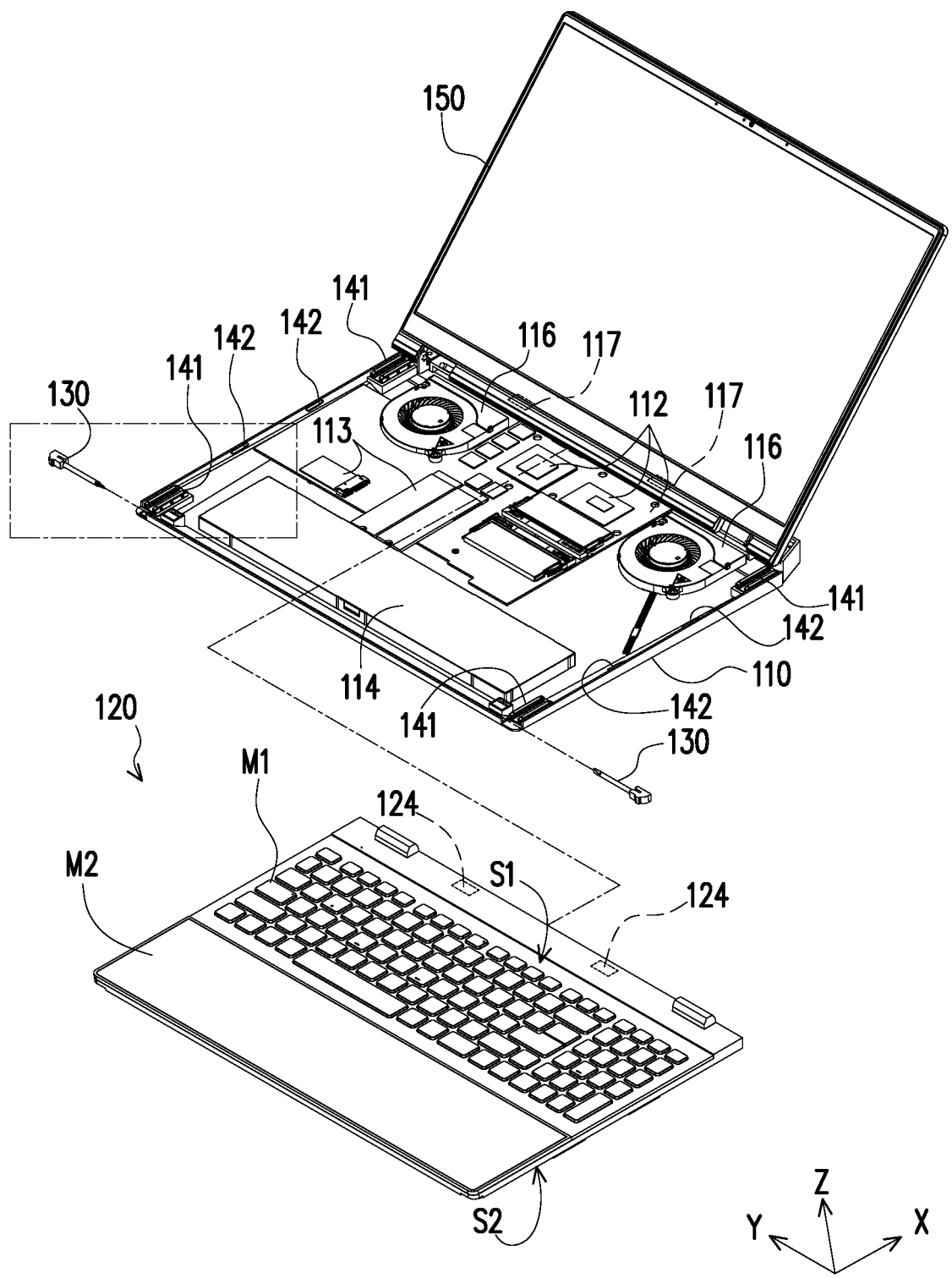
FIG. 1B is a disassembled schematic diagram of the laptop computer in FIG. 1A.

FIG. 1A is a schematic diagram of the laptop computer according to an embodiment of the present invention. FIG. 1B is a disassembled schematic diagram of the laptop computer in FIG. 1A. The rectangular coordinates X-Y-Z are provided here to facilitate the component description. Referring to FIG. 1A and FIG. 1B at the same time, in the embodiment, the laptop computer 100 includes a system host 110, a modular platform 120, a tool 130, a screen 150, and a hinge 160, wherein the screen 150 is pivotally connected to one side of the system host 110 through the hinge 160. The tool 130 is pluggably disposed on the other side of the system host 110, that is, the hinge 160 and the tool 130 are located on opposite sides of the system host 110 along the X-axis. The modular platform 120 is slidably arranged on the system host 110 along the X axis, so that it can slide out from the system host 110 as shown in FIG. 1B and finally be removed from the system host 110 when there is a specific need, thereby exposing a control module 112, a card 113, a battery 114, and a fan 116 in the system host 110. Wherein the control module 112 includes a motherboard and its control units (such as CPU and GPU or other control components). The card 113 is, for example, a memory, a wireless communication module or other card-type modules that can be combined with the motherboard through a card structure. It should also be mentioned that the system host 110 of the embodiment also has a magnetic component 117, and the modular platform 120 also has a magnetic component 124. And the magnetic components 117 and 124 are matching components that can magnetically attract each other. Accordingly, after removing the tool 130, the user can apply force to overcome the magnetic attraction force and drive the modular platform 120 to slide relative to the system host 110, so as to achieve the effect of tool-free disassembly and assembly. Furthermore, through the configuration of the modular platform 120, the laptop computer 100 can centralize related components that can be disassembled and assembled without tools on the modular platform 120. And the components that require tools for disassembly and assembly are placed in the system host 110, and the disassembly and assembly process is used as the classification judgment of the components, thereby providing a more convenient disassembly and assembly environment for the user.

Here, the slidable modular platform 120 has two surfaces (surfaces S1, S2) opposite to each other, wherein the surface S2 substantially faces related components provided in the system host 110.

Figure 1C:
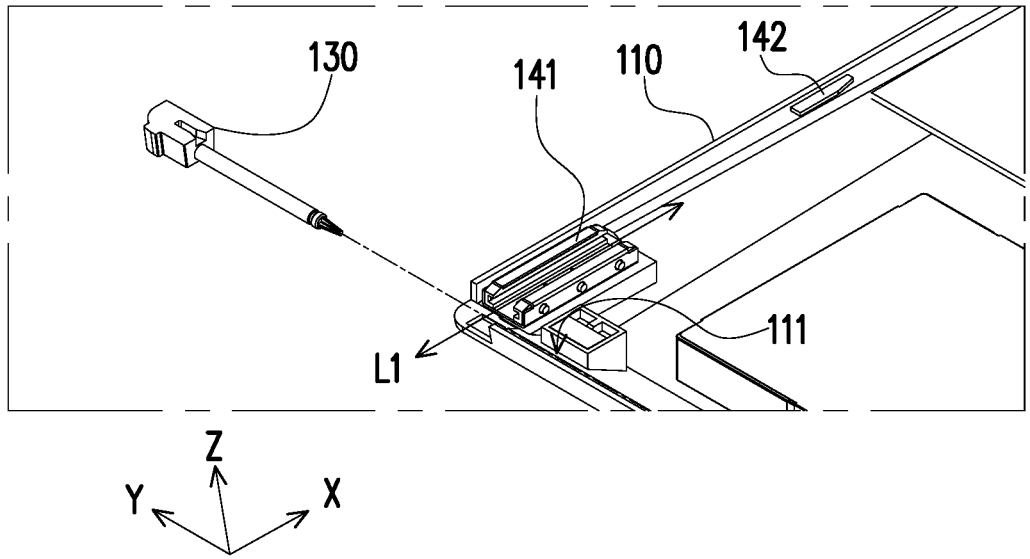
FIG. 1C and FIG. 1D are schematic diagrams respectively showing disassembly and assembly of the partial components in FIG. 1B.
Figure 1D:
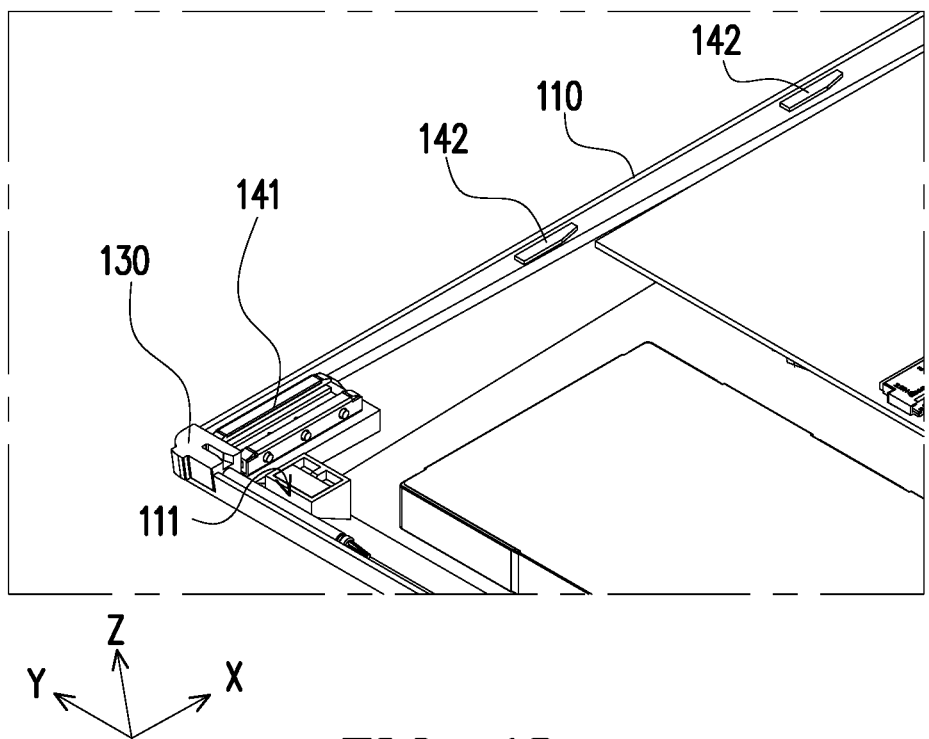

FIG. 1C and FIG. 1D are schematic diagrams respectively showing disassembly and assembly of the partial components in FIG. 1B. Referring to FIG. 1B, FIG. 1C and FIG. 1D at the same time, the tool 130 of the embodiment can further serve as a stop pin corresponding to whether the modular platform 120 can slide. As shown in FIG. 1B and FIG. 1C, after the user takes out the tool 130 from a receiving slot 111 of the system host 110, the user can slide the modular platform 120 to expose the above components. That is, when the tool 130 assembled to the system host 110 (i.e., the tool 130 located in the receiving slot 111) is actually at the assembly position as shown in FIG. 1D on a sliding path L1 of the modular platform 120, the sliding path L1 can be effectively cut off. In this way, when taking out the tool 130, it also means that the user will disassemble and assemble the relevant components of the system host 110.

Figure 1E:
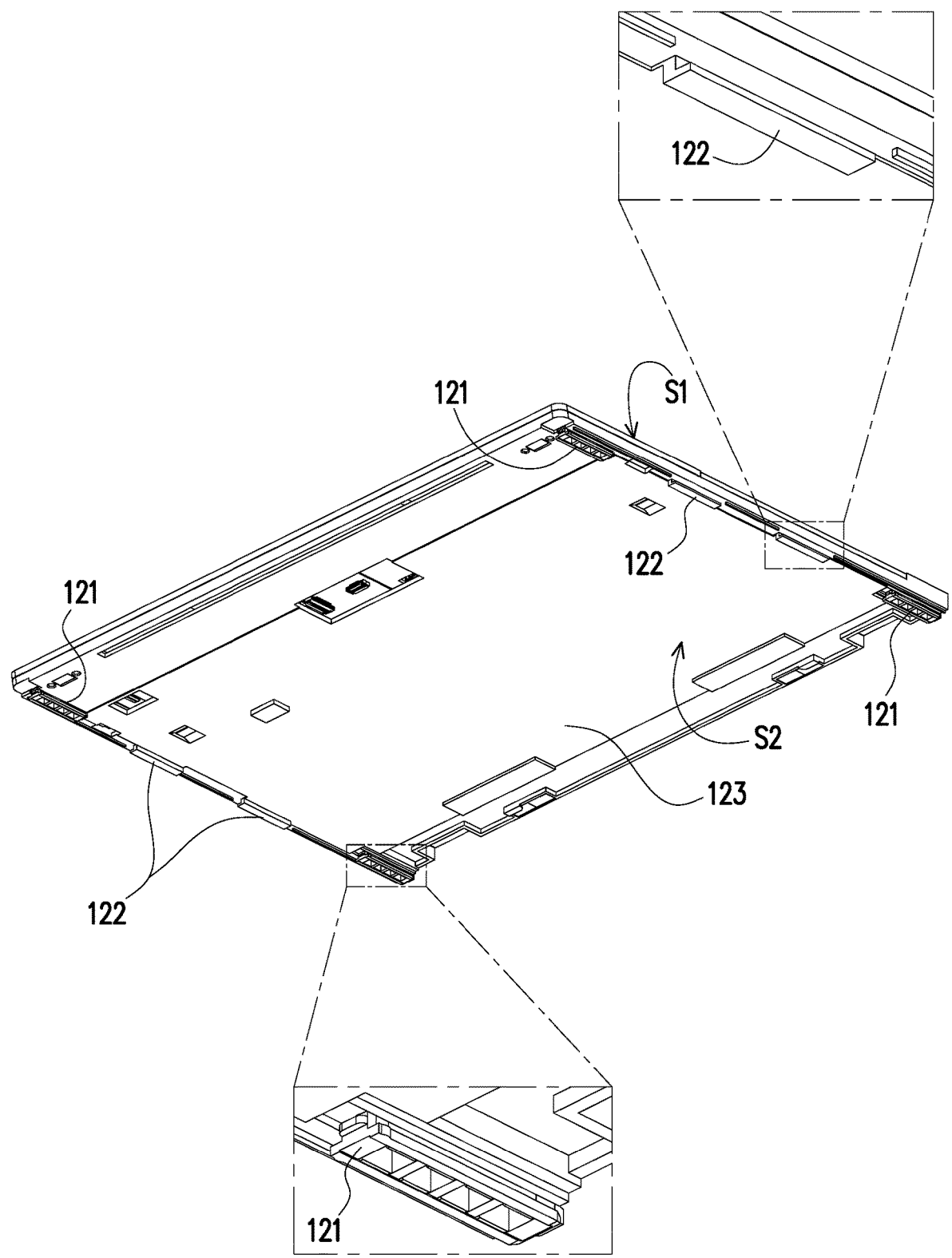
FIG. 1E illustrates the modular platform of FIG. 1B from another perspective.
Figure 2:
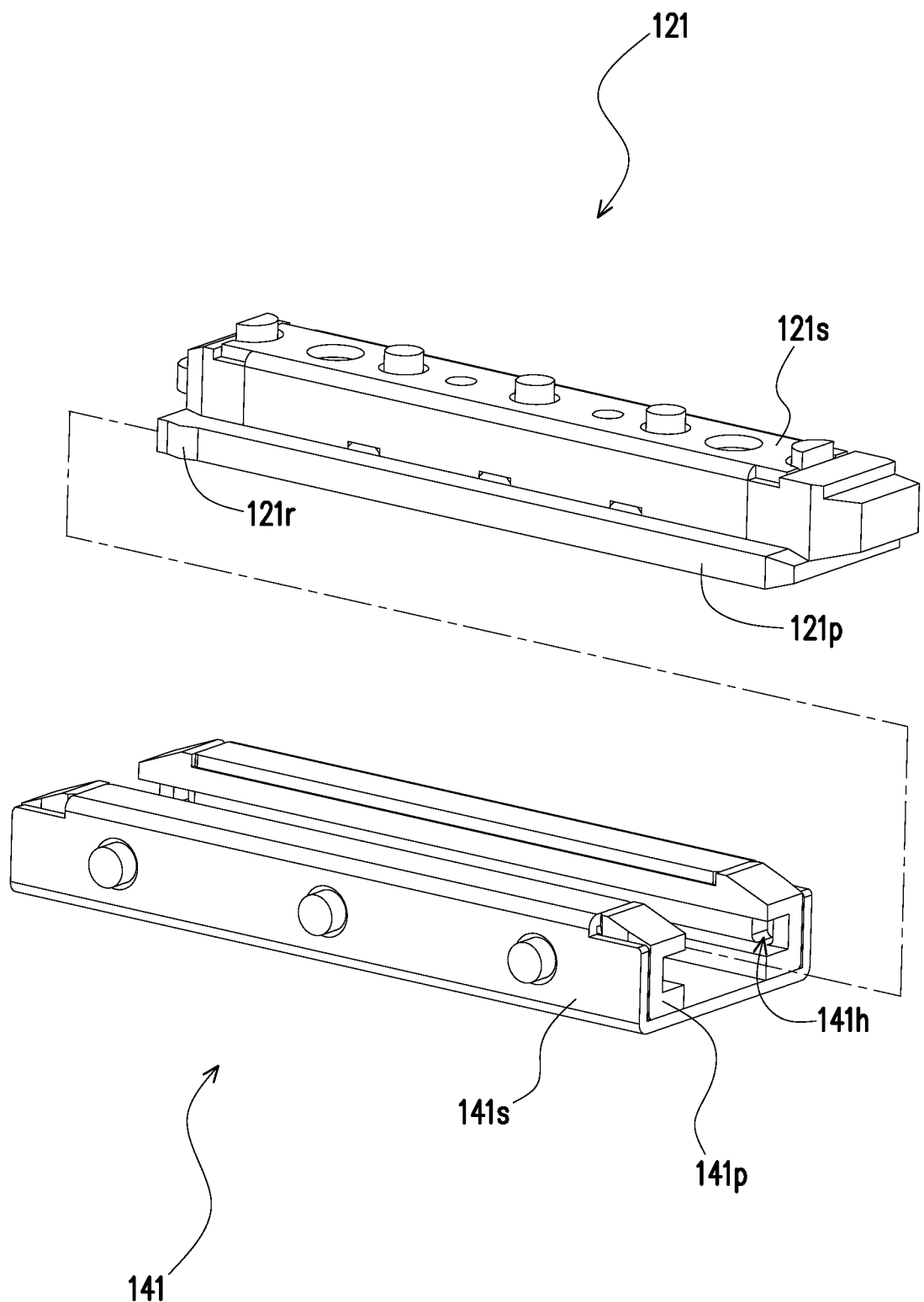
FIG. 2 is a schematic diagram of the rail structure in FIG. 1B and FIG. 1E.

FIG. 1E illustrates the modular platform of FIG. 1B from another perspective. FIG. 2 is a schematic diagram of the rail structure in FIG. 1B and FIG. 1E. Referring to FIG. 1E and FIG. 2 at the same time, and refer to any one of FIG. 1B to FIG. 1D. In the embodiment, the laptop computer 100 further includes a rail structure which is respectively disposed on the system host 110 and the modular platform 120. In details, the rail structure includes a first track piece 141 disposed within the system host 110 and a second track piece 121 disposed at the bottom of the modular platform 120, and the first track piece 141 and the second track piece 121 are structures that can slide together with each other. As shown in FIG. 1B, a plurality of first track pieces 141 are respectively arranged on opposite sides of the system host 110 along the Y-axis, and two first track pieces 141 located on the same side form a track path that is slidable along the X-axis (that is, the aforementioned sliding path L1). Correspondingly, as shown in FIG. 1E, a plurality of second track pieces 121 are provided at the bottom of a platform 123 of the modular platform 120 to correspond to the aforementioned first track pieces 141. Therefore, as shown in FIG. 2, the effect of the combination of the first track piece 141 and the second track piece 121 is to make the modular platform 120 slide along the X-axis relative to the system host 110.

Furthermore, the first track piece 141 of the embodiment has a metal part 141$s$ and a plastic part 141$p$, and the metal part 141$s$ is coated on the outside of the plastic part 141$p$. The second track piece 121 has a metal part 121$s$ and a plastic part 121$p$, and the plastic part 121$p$ is coated on the outside of the metal part 121$s$. Accordingly, the first track piece 141 and the second track piece 121 slide with the plastic parts 141$p$ and 121$p$ in contact with each other. This allows the first track piece 141 and the second track piece 121 to maintain their structural strength due to the metal part 141$s$ and the metal part 121$s$, and the plastic part 141$p$ and the plastic part 121$p$ can also be used to maintain the low friction and low loss required for sliding.

In addition, referring to FIG. 2 and comparing it to FIG. 1B, the first track piece 141 of the embodiment has a positioning hole 141$h$ adjacent to one end of the tool 130. When the modular platform 120 is assembled on the system host 110, the second track piece 121 has a convex portion 121$r$ adjacent to a pivot joint (also equivalent to where the hinge 160 is) of the screen 150 and the system host 110. Thereby, when the modular platform 120 slides relative to the system host 110 and moves away from the pivot joint, the convex portion 121$r$ will be temporarily positioned in the positioning hole 141$h$ to provide the user with a step-by-step feel when sliding the modular platform 120 out of the system host 110.

Figure 3:
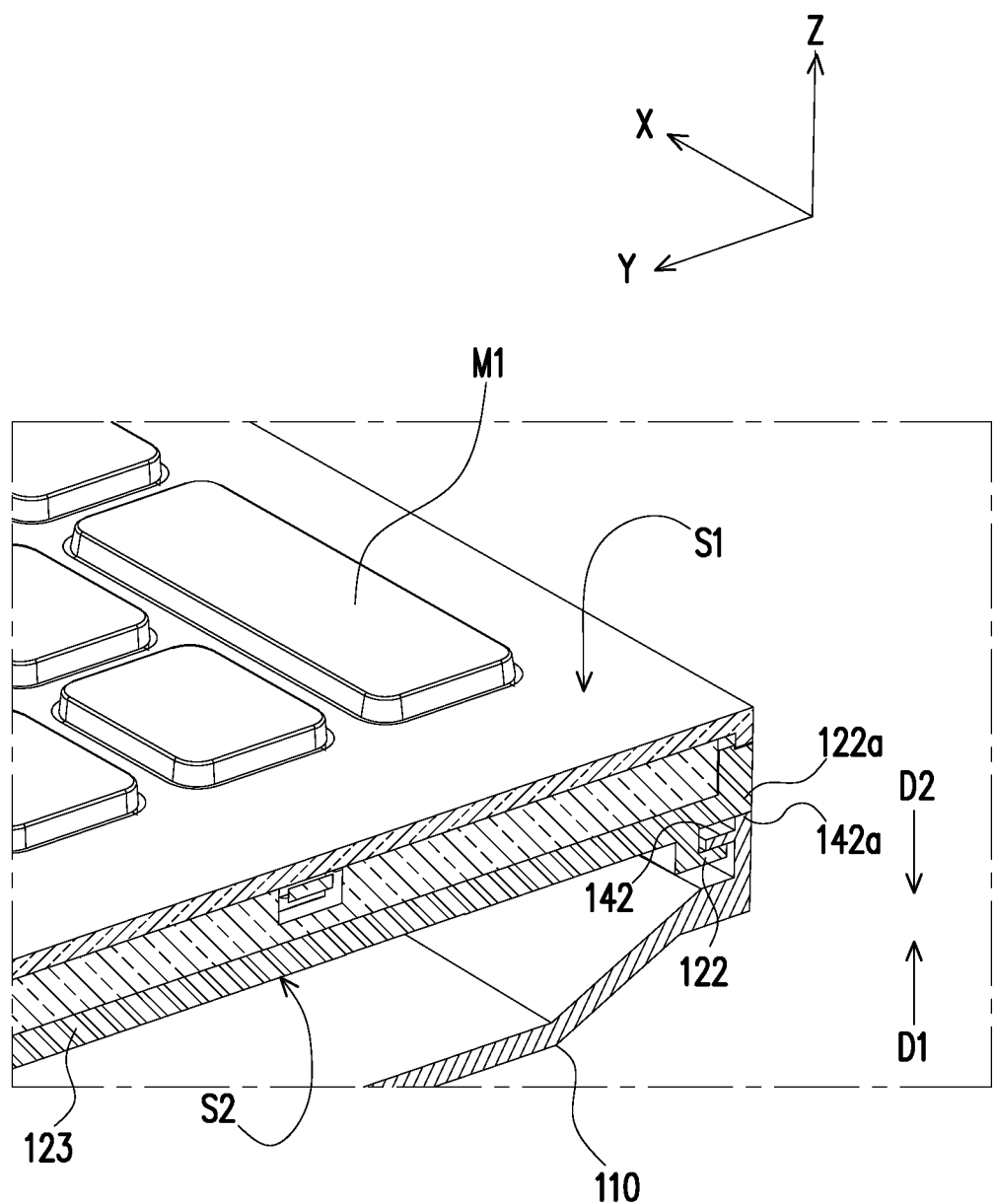
FIG. 3 is a partial sectional view of the laptop computer.

FIG. 3 is a partial sectional view of the laptop computer. Referring to FIG. 1B, FIG. 1D, and FIG. 3 at the same time, in the embodiment, the rail structure further includes a third track piece 142 and a fourth track piece 122, wherein the third track piece 142 is set on the system host 110 and is located between two first track pieces 141, and the fourth track piece 122 is set on the modular platform 120 and is located between two second track pieces 121. Herein, the third track piece 142 is a protruding rib, and the fourth track piece 122 is a hook. And the hook presses against the protruding rib along a first direction D1. However, the third track piece 142 and the fourth track piece 122 still maintain a relative sliding mechanism along the X-axis, and have both sliding properties and structural support between the modular platform 120 and the system host 110. On the other hand, the third track piece 142 of the embodiment has a first extension part 142$a$, and the fourth track piece 122 has a second extension part 122$a$. And the second extension part 122$a$ presses against the first extension part 142$a$ along a second direction D2, wherein the first direction D1 is opposite to the second direction D2. As shown in FIG. 3, the pressing directions of the first extension part 142$a$ and the second extension part 122$a$ are substantially opposite to the third track piece 142 and the fourth track piece 122. And since the third track piece 142, the first extension part 142$a$ and the system host 110 have an integrated structure, and the fourth track piece 122, the second extension part 122$a$ and the platform 123 have an integrated structure, so by opposing the pressing direction, the system host 110 and the modular platform 120 can be combined to have sufficient structural support, while also having the sliding ability provided by the rail structure.

Figure 4A:
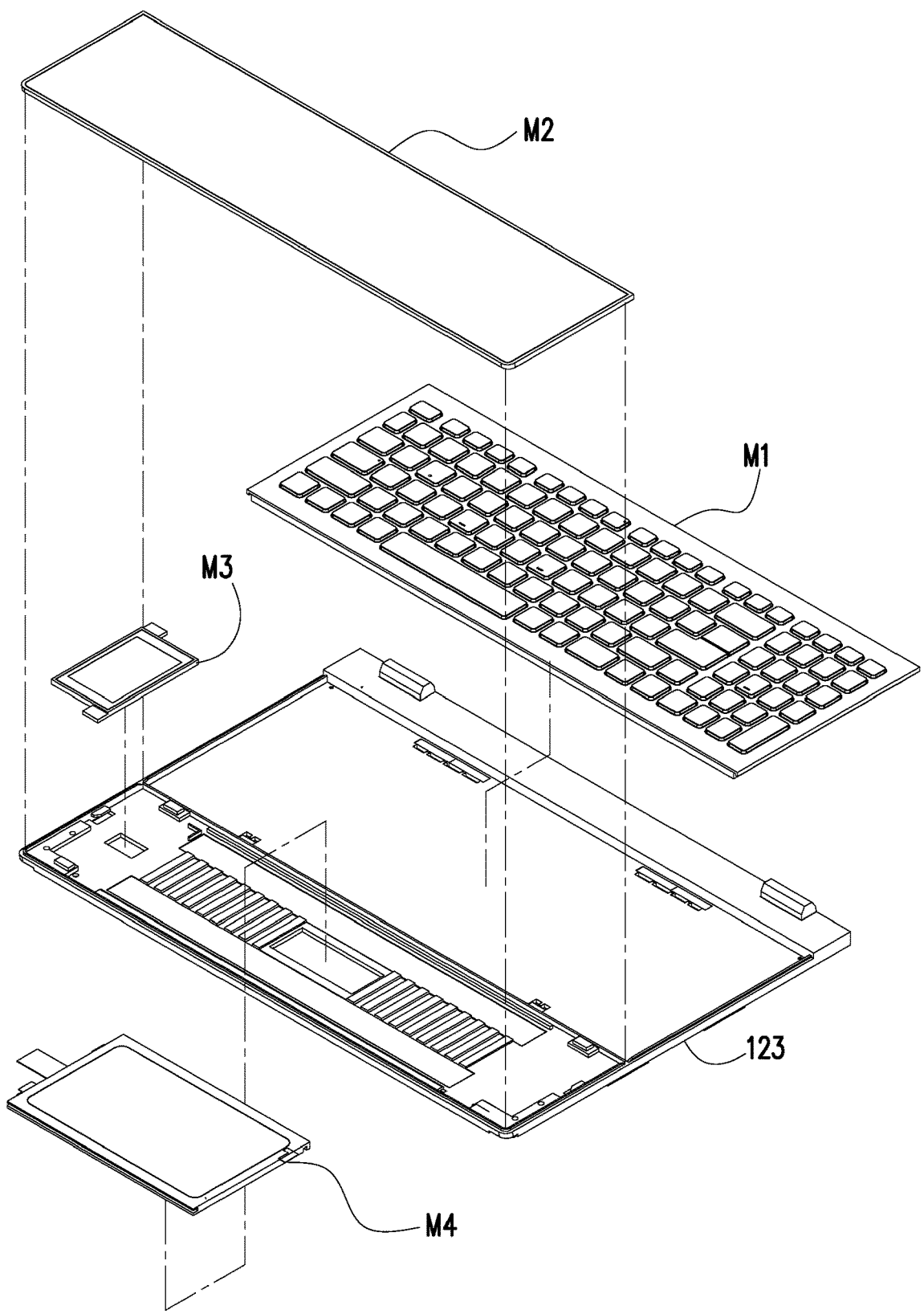
FIG. 4A is a disassembled schematic diagram of the modular platform.
Figure 4B:
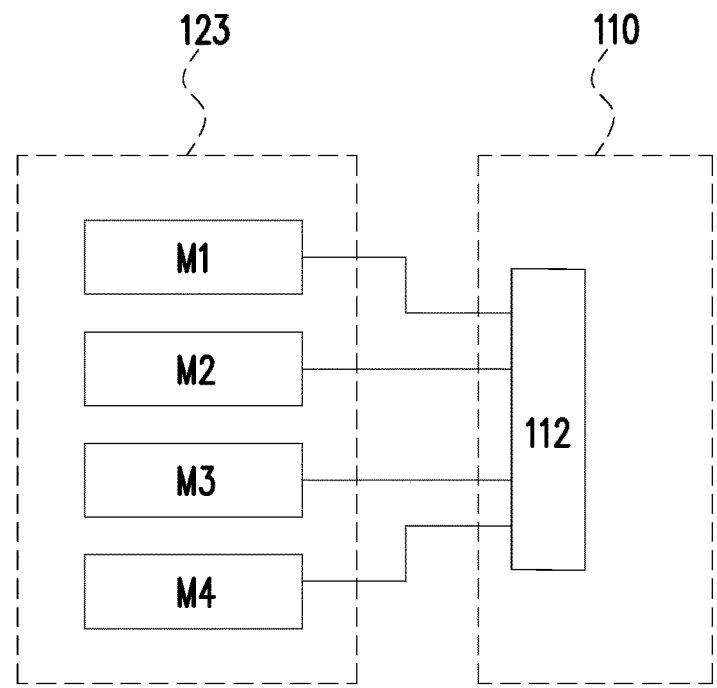
FIG. 4B is an electrical connection diagram of the modular platform in FIG. 4A and FIG. 2.
Figure 4C:
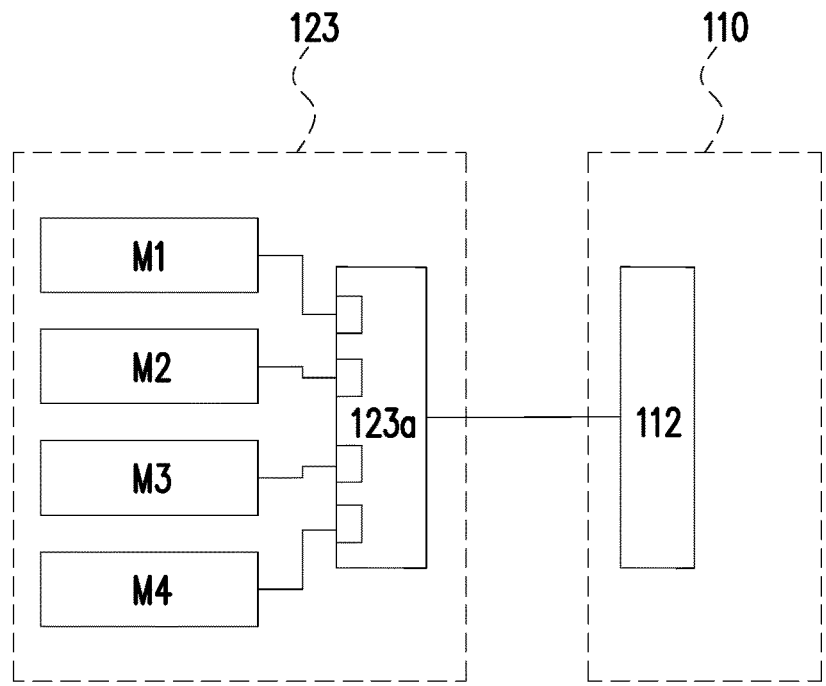
FIG. 4C is an electrical connection diagram of another embodiment.

FIG. 4A is a disassembled schematic diagram of the modular platform. FIG. 4B is an electrical connection diagram of the modular platform in FIG. 4A and FIG. 2. FIG. 4C is an electrical connection diagram of another embodiment. Referring to FIG. 4A to FIG. 4C at the same time, in the embodiment, the modular platform 120 includes the aforementioned platform 123 and a plurality of modules M1~M4 provided on the platform 123. These modules M1~M4 are detachably assembled on the platform 123 by, for example, magnetic means, and the second track piece 121 and the fourth track piece 122 of the rail structure are disposed on the lower surface of the platform 123. In the embodiment, the module M1 is, for example, a keyboard, having the aforementioned surface S1. The module M2 is, for example, a palmrest. The module M3 is, for example, a light-emitting module. The module M4 is, for example, a touch panel. Wherein the modules M3, M4 are first disposed on the platform 123, and then the module M2 is stacked and covers the modules M3, M4. Here, the module M2 is light-transmissive, so that users can still identify the modules M3 and M4, while also providing visual aesthetic effects. Simply put, the modular platform 120 configures the above-mentioned modules M1~M4 that can be easily disassembled and assembled on the platform 123, and then the platform 123 can be assembled or disassembled with the system host 110 through the rail structure, thereby improving the convenience of operation or disassembly.

Furthermore, the platform 123 of the embodiment has a plurality of openings or channels in communication with the system host 110, therefore the above-mentioned modules M1~M4 can be electrically connected to the control module 112 provided in the system host 110 through wires, cables or quick connectors. In another embodiment, as shown in FIG. 4C, the modular platform 120 further includes a transfer module 123a which is electrically connected to the control module 112 of the system host 110. And the above-mentioned modules M1~M4 are respectively electrically connected to the transfer module 123a to be electrically connected to the control module 112 via the transfer module 123a. Here, the transfer module 123a is, for example, a pogo pin connection component. That is to say, when the modules M1~M4 are assembled to the platform 123, the electrical connection parts (not shown) of the modules M1~M4 can contact the pogo pin connection component to complete the electrical connection, thus improving the operational convenience of the modules M1~M4.

Figure 5:
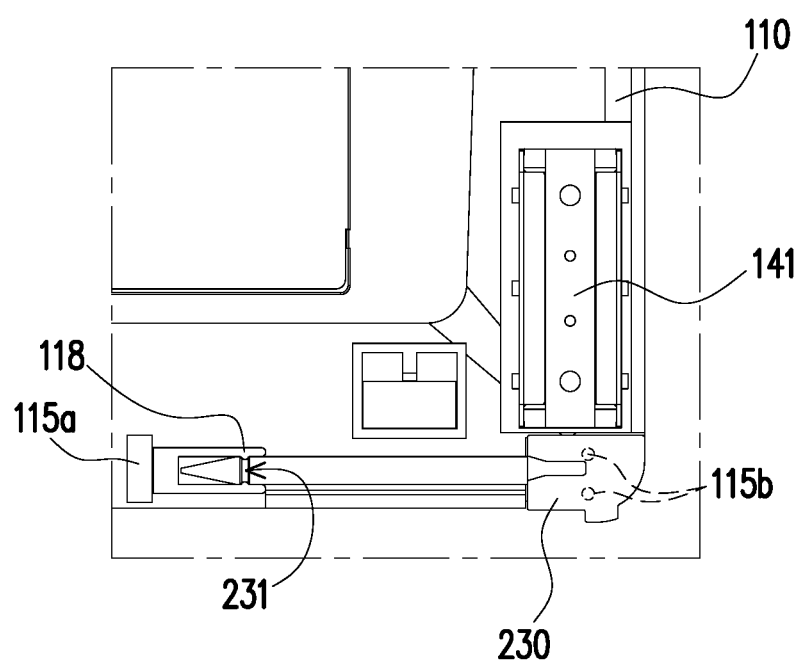
FIG. 5 is a partial top view of the system host according to another embodiment of the present invention.

FIG. 5 is a partial top view of the system host according to another embodiment of the present invention. Referring to FIG. 5, a tool 230 of the embodiment is magnetically conductive. And the system host 110 further includes a plurality of magnetic components 115a, 115b, so that when the tool 230 is assembled to the system host 110, the magnetic components 115a, 115b can provide a magnetic fixation effect to the tool 230. In addition, the system host 110 further includes a retaining elastic arm 118 corresponding to a card slot 231 on the surface of the tool 230 to provide a retaining and fixing effect on the tool 230 located in the system host 110.

In summary, in the above-described embodiment of the present invention, the laptop computer provides a modular platform, and allows the modular platform to be slidably assembled on the system host through the rail structure. Furthermore, the laptop computer also provides a tool, and the tool is pluggably assembled in the system host, so that the tool can be used directly during disassembly and assembly without the need for additional preparation. More importantly, when the laptop computer assembles the tools on the system host, it is located on the sliding path of the modular platform. In this way, tools inserted into the system host can become a latch structure that controls whether the modular platform can be removed from the system host, further giving the tool additional latch functions. After the user removes the tool from the system host, that is, after the user can slide the modular platform, the tool can be used to disassemble and assemble the components in the system host, so it is obviously convenient for disassembly and assembly.

Furthermore, relatively speaking, the laptop computer will classify the subordinate components according to the disassembly and assembly process, which means that the modules that can be easily disassembled and assembled can be concentrated on the modular platform to achieve the effect of tool-free disassembly and assembly. The components that need to be locked/unlocked for disassembly and assembly are concentrated in the system host, so that users can immediately disassemble and assemble the internal components of the system host after taking out the tools and moving them away from the modular platform. This effectively classifies the relevant components of the laptop computer to provide users with convenience during operation, replacement or repair, and at the same time, the laptop computer has the characteristics of sustainable use through the above-mentioned repairability features.

What is claimed is:

1. A laptop computer, comprising:
   a system host;
   a modular platform;
   a rail structure, disposed at the system host and the modular platform, the modular platform slides relative to the system host via the rail structure to be assembled to or detached from the system host; and
   at least one tool, plugged into or out of the system host, and the tool is located on a sliding path of the modular platform when the tool is assembled to the system host, wherein the rail structure comprises a first track piece and a second track piece that slide together with each other, the first track piece is set on the system host, the second track piece is set on the modular platform.

2. The laptop computer according to claim 1, wherein the rail structure further comprises a third track piece and a fourth track piece, the third track piece is set on the system host, the fourth track piece is set on the modular platform.

3. The laptop computer according to claim 2, wherein the third track piece is a protruding rib, the fourth track piece is a hook, the hook presses against the protruding rib along a first direction.

4. The laptop computer according to claim 3, wherein the third track piece has a first extension part, the fourth track piece has a second extension part, the second extension part presses against the first extension part along a second direction, the first direction is opposite to the second direction.

5. The laptop computer according to claim 1, wherein the first track piece and the second track piece each have a metal part and a plastic part, and the plastic parts are in contact with each other and slide.

6. The laptop computer according to claim 1, further comprises a screen, pivotally connected to the system host, a pivot joint between the screen and the system host and the tool are located on opposite sides of the system host, wherein the first track piece has a positioning hole at one end adjacent to the tool, and the second track piece has a convex portion adjacent the pivot joint to temporarily position the convex portion as the modular platform slides relative to the system host and away from the pivot joint in the positioning hole.

7. The laptop computer according to claim 1, wherein the modular platform comprises a platform and a plurality of modules, the modules are detachably assembled on the platform, and part of the rail structure is disposed on a lower surface of the platform.

8. The laptop computer according to claim 1, wherein parts of the modules overlap each other.

9. The laptop computer according to claim 1, wherein the modular platform further comprises a transfer module, electrically connected to a control module of the system host, and the modules are respectively electrically connected to the transfer module.

* * * * *